United States Patent [19]

Hsieh

[11] Patent Number: 5,047,932

[45] Date of Patent: Sep. 10, 1991

[54] METHOD FOR CODING THE INPUT OF CHINESE CHARACTERS FROM A KEYBOARD ACCORDING TO THE FIRST PHONETIC SYMBOLS AND TONES THEREOF

[75] Inventor: Kou-Chang Hsieh, Boulder, Colo.

[73] Assignee: Talent Laboratory, Inc., Boulder, Colo.

[21] Appl. No.: 291,731

[22] Filed: Dec. 29, 1988

[51] Int. Cl.⁵ .................... B41J 5/30; G06F 15/38
[52] U.S. Cl. ................................ 364/419; 400/110
[58] Field of Search ............... 364/900, 419; 400/110

[56] References Cited

U.S. PATENT DOCUMENTS

| | | | |
|---|---|---|---|
| 4,096,934 | 6/1978 | Kirmser et al. | 400/110 |
| 4,484,305 | 11/1984 | Ho | 364/900 |
| 4,498,143 | 2/1985 | Strzelecki | 400/110 X |
| 4,500,872 | 2/1985 | Huang | 400/110 X |
| 4,679,951 | 7/1987 | King et al. | 400/110 |
| 4,698,758 | 10/1987 | Larsen | 364/419 |
| 4,760,528 | 7/1988 | Levin | 364/419 |

Primary Examiner—Clark A. Jablon
Attorney, Agent, or Firm—Ladas & Parry

[57] ABSTRACT

A method for coding the input of Chinese characters from a keyboard according to the first phonetic symbols and tones thereof includes the steps of making a dictionary; establishing a conversion table which converts each of Chinese phonetic symbols to an approximate English letter in accordance with the phonetic similarities therebetween; establishing coding rules for coding the Chinese characters in accordance with the first phonetic symbols and tones thereof; setting a mode selection symbol as the first symbol of the instruction codes for the English letter mode, the mode selection symbol being an English letter which is not present in the conversion table; and making an ASCII code keyboard which has a plurality of English alphabet keys, some of the English alphabet keys being respectively marked with a corresponding Chinese phonetic symbol according to the conversion table. The dictionary has an instruction code index section and an input/output conversion section.

4 Claims, 3 Drawing Sheets

METHOD FOR CODING THE INPUT OF CHINESE CHARACTERS FROM A KEYBOARD ACCORDING TO THE FIRST PHONETIC SYMBOLS AND TONES THEREOF

BACKGROUND OF THE INVENTION

This invention relates to a method for coding the input of Chinese characters from a keyboard in accordance with the first phonetic symbols and tones thereof.

Computers have been developed to deal with Chinese information. The improvement of this invention is directed to Chinese information processing computers in which Chinese characters are coded in accordance with their entire pronunciation. The pronunciation of a Chinese character consists of a phonetic spelling and a tone. For example, when Chinese character "峯" is to be output from a conventional computer, four keystrokes are needed in accordance with its pronunciation "ㄈㄨㄥˊ." This kind of computer deals with Chinese information very slowly unless the user is skilled in the phonetic spelling of Chinese characters according to the Chinese National Phonetic Alphabet. Furthermore, conventional computers can deal only with the input of a single Chinese character and not a single Chinese phrase.

SUMMARY OF THE INVENTION

It is therefore the main object of this invention to provide a method for coding the input of Chinese characters from a keyboard in accordance with the first phonetic symbols and tones thereof whereby Chinese information can be rapidly processed.

According to this invention, a method for encoding Chinese characters includes the steps of making a dictionary; establishing a conversion table which converts each of Chinese phonetic symbols to an approximate English letter in accordance with the phonetic similarities therebetween; establishing coding rules for coding Chinese characters in accordance with the first phonetic symbols and tones thereof; setting a mode selection symbol as the first symbol of instruction codes for the English letter mode, the mode selection symbol being an English letter which is not present in the conversion table; and making an ASCII code keyboard which has a plurality of English alphabet keys, some of the English alphabet keys being respectively marked with a corresponding Chinese phonetic symbol according to the conversion table.

The dictionary has an instruction code index section and an input/output conversion section. The instruction code index section includes a plurality of memory addresses, a plurality of machine codes respectively contained in the memory locations of the memory addresses, and a plurality of instruction codes corresponding to the machine codes. The input/output conversion section includes a plurality of memory addresses, a plurality of machine codes respectively contained in the memory locations of the memory addresses of the conversion section, and a plurality of input/output conversion instruction codes and Chinese characters.

The coding rules are set as follows: (i) when a Chinese phrase to be output has three or more characters, their instruction code includes a set of English letters phonetically resembling the respective first phonetic symbols of these Chinese characters, wherein the English letters are arranged in the same order as the corresponding Chinese characters; (ii) when a Chinese phrase to be output has two characters, their instruction code includes two English letters phonetically resembling the respective first phonetic symbols of these Chinese characters, and two numerals designating the respective tones of these Chinese characters, wherein the English letters and the numerals are arranged in a predetermined order; and (iii) when a single Chinese character is to be output, its instruction code includes an English letter phonetically resembling the first phonetic symbol of this Chinese character, and a numeral designating the tone of this Chinese character, wherein the English letter and the numeral are arranged in a predetermined order.

BRIEF DESCRIPTION OF THE DRAWINGS

Other features and advantages of this invention will become apparent in the following detailed description of the preferred embodiments of this invention, with reference to the accompanying drawings, in which.

BRIEF DESCRIPTION OF TABLES

Table 1 shows one representation of the instruction code index section of the dictionary used in the coding method of this invention;

Table 2 shows one representation of the input/output conversion section of the dictionary used in the coding method of this invention;

Table 3 is a conversion table in which all of the Chinese phonetic symbols are converted to English letters so as to perform the coding method of this invention;

Table 4 illustrates the special technical term section of the dictionary used in the coding method of this invention;

Table 5 illustrates the unit character section of the dictionary used in the coding method of this invention;

Table 6 is a table which is similar to Table 2 except that the characteristics of Chinese phrases are designated by inserting a characteristic representing numeral thereafter;

Tables 7–10 are reference tables listing recognition codes whereby one Chinese character can be selected from a group of Chinese characters which have the same basic root;

Table 11 shows a portion of the coversion section of the dictionary in which the instruction codes include the recognition codes;

Table 12 lists seven different uses of the English letters which are not present in Table 3;

Table 13 is a modified form of the index section of the dictionary shown in Table 1; and Table 14 is a modified form of the conversion section of the dictionary shown in Table 2 in association with Table 13.

DETAILED DESCRIPTION OF THE PREFERRED EMBODIMENTS

Figure 1:
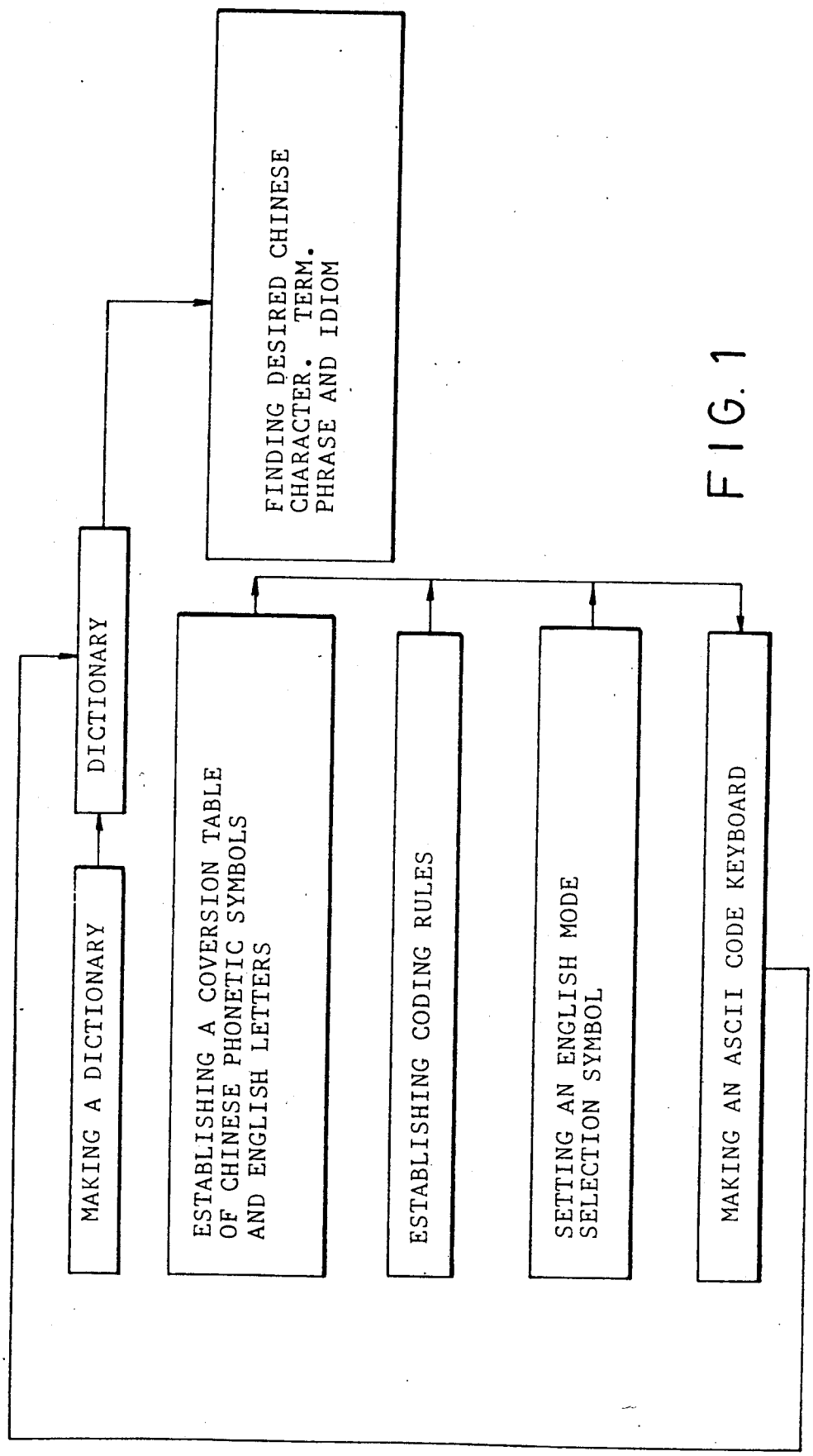
FIG. 1 is a flow chart of a Chinese character coding method according to this invention.

Referring to FIG. 1, this invention provides a method for coding Chinese characters. The coding method includes the following steps:

1. Making a dictionary which serves as a basic reference information source. The dictionary has an instruction code index section and an input/output conversion section. Each page of the conversion section consists of 1024 bytes.

Table 1 is a representation of the index section, while Table 2 is a representation of the conversion section. Each page of the dictionary is designated by a corresponding page number in a known manner. Either the index or conversion section includes a left memory address field, a middle machine code field with symbols of the ASCII code, and a right field. The right field of the index section lists all the instruction codes. Each of the instruction codes corresponds to one of the machine codes. For example, machine codes "61" and "34" designate instruction codes "a" and "4" respectively. The instruction codes in Table 1 are arranged in triads, e.g. aa4, amt, ba1, bd1 . . . etc. The first English letters of the instruction codes are alphabetically arranged.

The right field in the conversion section lists input-/output conversion instruction codes and Chinese characters. Any one of the instruction codes designates the Chinese phrase arranged thereafter. For example, the instruction code "amtf" designates the Chinese phrase "阿彌陀佛" The addition of the symbols ". ." in the right field permits the addition of information. From the instruction code index section of the dictionary, the user can find the position of the instruction code "amtf" in the conversion section of the dictionary.

2. Establishing Table 3 which is a conversion table wherein all of Chinese phonetic symbols are converted to English letters. Phonetic similarity occurs between the major part of Chinese phonetic symbols and English letters. The conversion between Chinese phonetic symbols and English letters is established in this conversion table in accordance with the phonetic similarities therebetween. For example, the pronunciation of the Chinese phonetic symbol "ㄅ" is similar to that of the English letter "B." The easily confused vowels of Chinese phonetic symbols are all converted to the English letter "A" in this conversion table.

3. Establishing coding rules for coding Chinese characters as follows:

(i) When the Chinese phrase to be output has three or more characters, its instruction code includes a set of English letters which phonetically resemble the first phonetic symbols of these Chinese characters. For example, the instruction code of the Chinese phrase "中華民國" is "zhmg" because the entire pronunciation of this phrase is " ㄓㄨㄥ ㄏㄨㄚˊ ㄇㄧㄣˊ ㄍㄨㄛˊ ." The first phonetic symbols of these characters are "ㄓ," "ㄏ," "ㄇ" and "ㄍ" which correspond to the English letters "z," "h," "m" and "g" respectively.

(ii) When the Chinese phrase to be output has only two characters, its instruction code includes two English letters phonetically resembling the first phonetic symbols of these Chinese characters, and two Arabic numerals designating the tones of these Chinese characters. The four symbols of the instruction code of a two-word Chinese phrase are arranged in the sequence of "the English letter corresponding to the first phonetic symbol of the first character of this phrase, the English letter corresponding to the first phonetic symbol of the second character of this phrase, the numeral corresponding to the tone of the first character of this phrase, and the numeral corresponding to the tone of the second character of this phrase." For example, the instruction code of the Chinese phrase "自由" is "zy43" because the entire pronunciation of this phrase is "ㄗˋ ㄧㄡˊ ." The first phonetic symbols of these characters are "ㄗ" and "ㄧ" which correspond to the English letters "z" and "y." The tones of these characters are "ˋ" and "ˇ." Because the tone symbols "ˉ," "ˊ," "ˇ" and "ˋ" are not present in the ASCII code, they are respectively replaced with the Arabic numerals "1," "2," "3" and "4" in the dictionary.

(iii) When a single Chinese character is to be output, its instruction code includes an English letter phonetically resembling the first phonetic symbol of this character, and an Arabic numeral designating the tone of this character. For example, the instruction code of the Chinese character "大" is "d4" because the entire pronunciation of this character is "ㄉㄚˋ ." The first phonetic symbol of this character is "ㄉ" which corresponds to English letter "d." The tone of this character is "ˋ" which is designated by Arabic numeral "4."

4. Setting English letters, which are not present in Table 3, as the first symbols of instruction codes for selection of modes. In this embodiment, the modes are set as follows:

(1) English mode, when "e" is the mode selection symbol. For example, when "esun" is the instruction code, the English word "sun" is output.

(2) Special technical term mode, when "v" is the mode selection symbol. For example, when the code "vbdt" is input, the Chinese term "半導體" which means "semiconductor," is output. The instruction codes of special technical terms are listed in Table 4 wherein the code "bdt" represents "半導體." Instruction code "vbd" can be found in the instruction code index section shown in Table 1. The first phonetic symbols of the characters "半導體" are "ㄅ," "ㄉ" and "ㄊ" which phonetically resemble the English letters "b," "d" and "t" respectively.

(3) Unit mode, when "Y" is the mode selection symbol. For example, instruction code "yb3" designates the Chinese character "版" which means "section," illustrating the division of a piece of writing. The characters used as various units are listed in Table 5. Instruction code "yb" can also be found in the instruction code index section of the dictionary shown in Table 1. Referring to FIG. 5, instruction codes "yc3" and "yc4" designate the Chinese characters "場" and "處" respectively.

Figure 2:
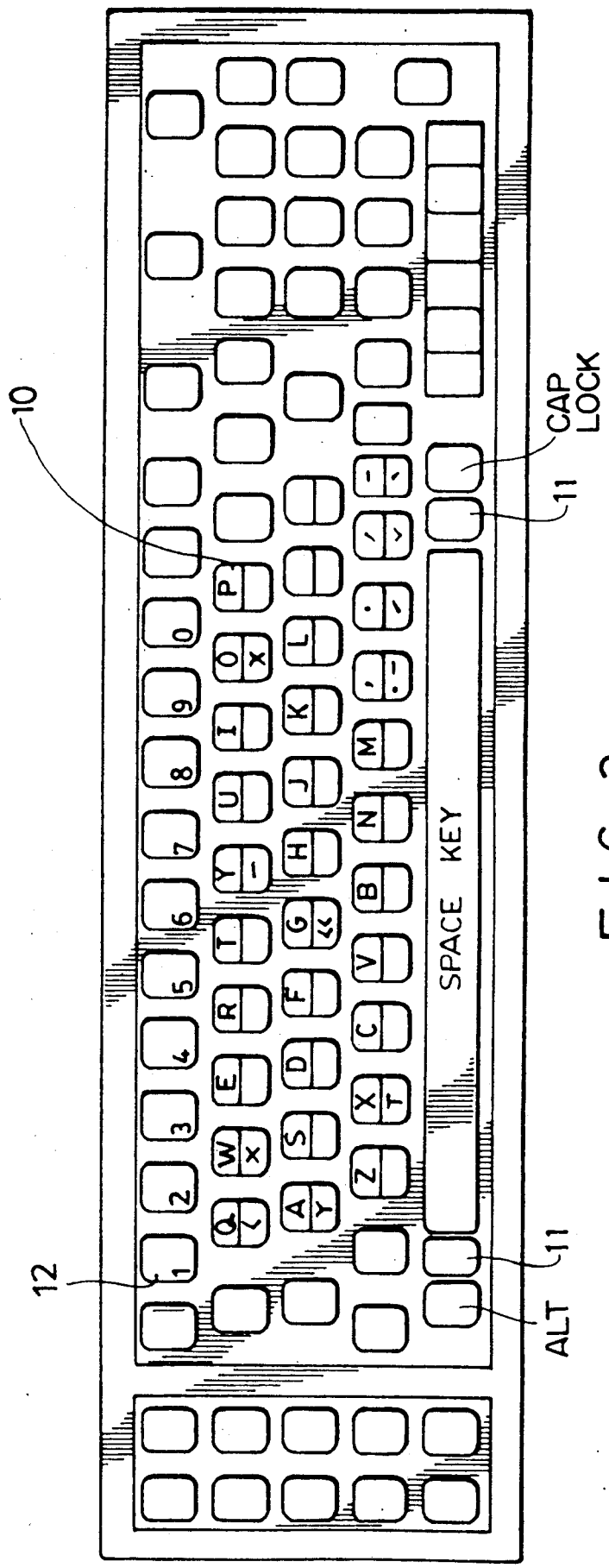
FIGS. 2 and 2A are schematic views illustrating an ASCII code keyboard performing the coding method of this invention.
Figure 2A:
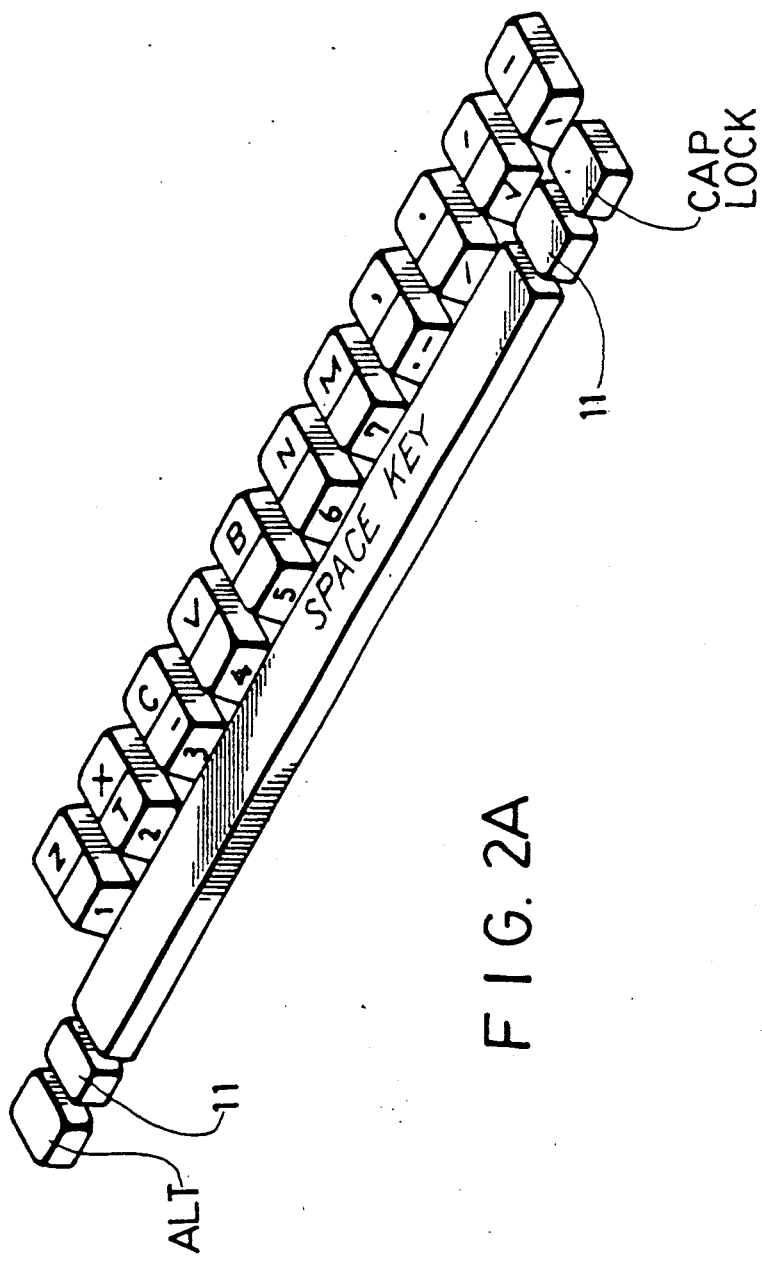

5. Making an ASCII code keyboard shown in FIGS. 2 and 2A. As illustrated, the keyboard has a plurality of English alphabet keys 10. When any key on the keyboard is pressed, an ASCII code signal is generated and output. Some of the English alphabet keys 10 are marked with the corresponding Chinese phonetic symbols according to Table 3 and will be referred to as "the tone symbol keys." More importantly, two character and tone choice keys 11 are provided on the keyboard on the two sides of the space key. Referring to FIG. 2A, character choice order numerals 1-7 are marked on the side surfaces of the English alphabet keys "Z," "X," "C," "V," "B," "N" and "M" respectively. In addition, the tone symbols of the light and first tones "ˉ," the second tone "ˊ," the third tone "ˇ" and the fourth tone "ˋ" of Chinese characters are marked on the side surfaces of the symbol keys of a comma mark ",," period mark ".," a slant mark "/" and a dash mark "-" respectively. Normally, the first tone of Chinese characters is indicated by indicating no mark in the surrounding area of their phonetic symbols. Here, the first tone of Chinese characters is designated by the symbol "ˉ" for purpose of convenience. Because Chinese characters of the light tone are very few, both the light tone symbol "`" and the first tone symbol "—" are marked on the symbol key of the comma mark ",". When a Chinese phrase is output in the display screen of a Chinese information processing computer of this invention, the user may in turn depress either of the choice keys 11 and the selected one of the order number keys shown in FIG. 2A so that only one selected character of the displayed phrase remains in the display screen. For example, when the phrase "中 華 民 國" is displayed on the display screen, the user may in turn depress either of choice keys 11 and the English alphabet key of "X" which is marked with the order numeral "2", so that the characters "中," "民" and "國" are deleted from the display screen. That is, only the selected character "華" remains on the display screen. When the instruction code "zy43" is to be input, the user in turn depresses the English alphabet keys "z" and "y" as well as either of the tone choice keys 11 and the upper row of numeral keys 12 "4" and "3."

When a plurality of Chinese characters or phrases are displayed on the display screen of the computer of this invention, one of them may be selected by depressing one of the numeral keys 12 in a known manner.

In addition to the above-mentioned conventional phrase selecting method, to select one phrase from a group of phrases, characteristic representing numerals may be set as follows:

0—noun
1—verb
3—adjective
4—pronoun
5—preposition
6—conjunction
7—auxiliary verb
8—interjection For example, when instruction code "ap12" is input from the keyboard, the Chinese noun phrase "阿婆" and verb phrase "安排" are displayed on the display screen. Then, if the numeral key 12 of numeral "0" is depressed, the verb phrase "安排" will be deleted from the display screen. In other words, when instruction code "ap120" is input from the keyboard, only the noun phrase "阿婆" is displayed on the display screen. Such codes are listed in Table 6.

To facilitate the output of a single Chinese character, Tables 7–10 are established. When an instruction code including an English letter and a numeral is input, a large number of Chinese characters may be displayed on the display screen. In fact, Chinese characters having the same first phonetic symbol and the same tone often have the same basic root and different secondary roots. The secondary roots can be recognized by the information contained in Tables 7–10. For example, when the Chinese characters "渙," "漢" and "煥" are displayed on the display screen by key-inputting instruction codes "a4" in accordance with the coding rule (iii), the user may input code "T3" so that only the character "漢" remains on the display screen. The normal pronunciation of the character "士" is "ㄊㄨˇ" which has the first phonetic symbol, "ㄊ" phonetically resembling the English letter "T," and the tone "ˇ" designated by the numeral "3." However, when the character "漢" is desired, the user inputs the instruction code "s3" in accordance with the customary pronunciation method contained in Tables 7–10. The secondary root of the character "漢" is "氵" which customarily denotes "水." The pronunciation of the character "水" is "ㄕㄨㄟˇ" which has the first phonetic symbol "ㄕ" phonetically resembling the English letter "S," and the tone "ˇ" designated by the numeral "3." Such codes are listed in Table 11.

Another method for selecting one character from a group of characters includes the steps of finding a Chinese phrase using coding rule (i) or (ii), and selecting one character from the phrase by in turn depressing either of the choice keys 11 and the selected one of the English alphabet or the order number keys shown in FIG. 2A.

Alternatively, an English letter may be inserted into the middle of an instruction code which is used to find a Chinese phrase according to the coding rule (i) or (2) so as to select one character from this phrase. That is to say, when instruction code "zy43" is input, the Chinese phrase "自由" is output. When instruction code "zyy43," however, is input, the Chinese character "由" is output. In the same fashion, when instruction code "zyz43" is input, the Chinese character "自" is output.

Referring to Table 12, unlike Table 3, English letters corresponding to the Chinese phonetic symbols "ㄨ," " " and the confusing Chinese vowels may be arranged in seven other ways, after which, four English letters remain to serve as mode selection symbols.

Referring to Tables 13 and 14 which respectively illustrate a portion of the index section and a portion of the conversion section of the dictionary, the symbol sequence of the instruction code in the coding rule (ii) may be changed to "the English letter phonetically resembling the first phonetic symbol of the first character, the numeral designating the tone of the first character, the English letter phonetically resembling the first phonetic symbol of the second character, and the numeral designating the tone of the second character."

With this invention thus explained, it is apparent that numerous modifications and variations can be made without departing from the scope and spirit of this invention. It is therefore intended that this invention be limited only as indicated in the appended claims.

TABLE 1

```
00000000   D1 00 21 20 20 22 20 20-23 20 20 24 20 20 28 20    ..! " # $ (
00000010   20 61 61 34 61 6D 74 62-61 31 62 64 31 62 66 7A    aa4amtba1bd1bf.z
00000020   62 69 34 62 6B-62 62 6D-6A 62 72 34 62 74 31 62    bi4bkbbmjbr4bt1b
00000030   78 62 62 7A 34 63 61 32-63 64 31 63 67 34 63 6A    xbbz4ca2cd1cg4cj
00000040   31 63 6C 33 63 71 32 63-33 33 63 78 32 63 7A 33    1c13cq2cs3cx2cz3
00000050   64 61 32 64 64 31 64 68-32 64 6A 32 64 6C 34 64    da2dd1dh2dj2d14d
00000060   70 34 64 73 33 64 78 31-64 7A 33 64 7A 34 66 61    p4ds3dx1dz3dz4fa
00000070   31 66 64 6A 66 69 33 66-6C 34 66 72 32 66 74 32    1fdjfi3f14fr2ft2
00000080   66 7A 31 67 61 31 67 64-63 67 68 33 67 6A 34 67    fz1ga1gdcgh3gj4g
00000090   6D 6A 67 73 32 67 78 34-68 61 31 68 64 32 68 68    mjgs2gx4ha1hd2hh
000000A0   34 68 6A 74 68 72 32 68-74 34 68 7A 31 69 61 32    4hjthr2ht4hz1ia2
000000B0   69 63 67 69 67 32 69 69-34 69 6A 7A 69 6D 31 69    icgig2ii4ijzim1i
000000C0   71 31 69 73 33 69 75 32-69 79 31 6A 61 31 6A 63    q1is3iu2iy1ja1jc
```

```
000000D0  34 6A 66 32 6A 69 31 6A-6A 32 6A 6A 73 6A 6C 6B   4jf2ji1jj2jjsjlk
000000E0  6A 71 31 6A 73 31 6A 73-63 6A 75 31 6A 78 6C 6A   jq1js1jsc ju1jxlj
000000F0  7A 34 6B 61 33 6B 69 31-6B 71 31 6B 78 6A 6C 6A   z4ka3ki1kq1kxjla
00000100  32 6C 64 32 6C 67 6C 6C-6A 32 6C 6C 33 6C 71 32   2ld2lgllj2ll3lq2
00000110  6C 73 34 6C 78 32 6C 7A-33 6D 61 32 6D 66 33 6D   ls4lx2lz3ma2mf3m
00000120  6A 32 6D 6D 34 6D 73 34-6D 79 32 6E 61 32 6E 68   j2mm4ms4my2na2nh
00000130  6C 6E 6E 32 6E 78 34 6F-62 34 70 61 31 70 68 34   lnn2nx4ob4pa1ph4
00000140  70 70 31 70 78 32 71 61-31 71 66 34 71 6A 32 71   pp1px2qa1qf4qj2q
00000150  6E 31 71 73 32 71 78 34-72 61 32 72 6A 32 72 73   n1qs2qx4ra2rj2rs
00000160  32 73 61 31 73 63 34 73-66 32 73 68 34 73 6A 31   2sa1sc4sf2sh4sj1
00000170  73 6C 31 73 6D 32 73 71-34 73 73 33 73 74 68 73   sl1sm2sq4ss3sths
00000180  78 33 73 7A 32 74 61 31-74 66 31 74 69 32 74 6C   x3sz2ta1tf1ti2tl
00000190  32 74 72 32 74 74 64 74-7A 31 75 61 32 75 67 32   2tr2ttdtz1ua2ug2
000001A0  75 6B 32 75 71 6C 75 75-31 75 7A 34 76 62 64 77   uk2uqluuluz4vbdw
000001B0  61 31 77 62 32 77 62 34-77 63 32 77 63 34 77 64   a1wb2wb4wc2wc4wd
000001C0  32 77 64 34 77 66 32 77-67 31 77 67 33 77 68 32   2wd4wf2wg1wg3wh2
000001D0  77 68 34 77 69 32 77 69-34 77 6A 31 77 6A 32 77   wh4wi2wi4wj1wj2w
000001E0  6A 34 77 6B 32 77 6C 32-77 6C 33 77 6C 34 77 6D   j4wk2wl2wl3wl4wm
000001F0  33 77 6E 32 77 6F 32 77-70 33 77 71 31 77 71 34   3wn2wo2wp3wq1wq4
00000200  77 72 34 77 73 32 77 73-34 77 74 32 77 74 34 77   wr4ws2ws4wt2wt4w
00000210  75 33 77 78 31 77 78 33-77 79 32 77 7A 31 2A 7A   u3wx1wx3wy2wz1*z
00000220  34 77 7A 33 77 7A 34 00-7A 34 78 61 31 78 64 32   4wz3wz4.z4xa1xd2
00000230  78 68 32 78 6A 31 78 6C-32 78 70 32 78 73 31 78   xh2xj1xl2xp2xs1x
00000240  74 62 78 79 31 79 61 34-79 6A 34 79 6E 6B 79 78   tbxy1ya4yj4ynkyx
00000250  32 7A 61 31 7A 63 73 7A-66 6A 7A 68 7A 7A 6A 31   2za1zcszfjzhzzj1
00000260  7A 6C 31 7A 6E 32 7A 72-33 7A 73 34 7A 75 73 7A   zl1zn2zr3zs4zusz
00000270  7A 31 7A 7A 6C 00 00 00-00 00 00 00 00 00 00 00   z1zzl...........
```

TABLE 2

```
00002800  64 03 40 00 6D 74 66 88-A2 9C 5C 91 C9 98 C5 00   d.@.mtf阿彌陀佛.
00002810  00 6D 7A 88 A4 96 CA 8E-71 00 00 6E 31 32 88 C0   .mz愛面子..n12安
00002820  94 4A 00 00 88 C0 94 5C-00 00 88 C0 93 EC 00 00   寧..安能..安南..
00002830  6E 31 34 9B 53 9B 50 00-00 6E 34 33 9C E3 9C BB   n14娟娜..n43懊惱
00002840  00 00 88 C2 E7 E4 00 00-6F 31 34 88 A5 89 EC 00   ..按鈕..o14挨餓
00002850  00 70 31 32 88 A2 94 6B-00 00 88 C0 94 72 00 00   .p12阿婆..安排..
00002860  88 C0 95 BD 00 00 70 33-34 E1 E2 E3 F4 00 00 70   安平..p34烤胖..p
00002870  67 88 C0 95 BD 8D 60 00-00 71 31 32 88 A3 8B 81   g安平港..q12哀求
00002880  00 00 88 C0 91 53 00 00-71 34 31 88 A4 8B A8 00   ..安全..q41愛卿
00002890  00 88 A4 8D C8 00 00 71-34 32 88 A4 8F EE 00 00   .愛妻..q42愛情..
000028A0  88 C2 8A FA 00 00 88 C4-8F EE 00 00 71 34 34 88   按期..案情..q44暗
000028B0  C3 8A ED 00 00 98 FC 9F-86 00 00 71 62 6C 88 C0   器..傲氣..qbl安
000028C0  91 53 E0 DE 97 9E 00 00-71 63 73 88 C0 91 53 91   全玻璃..qcs安全措
000028D0  5B 8E 7B 00 00 71 64 88-C0 91 53 9B E6 00 00 88   施..qd安全份..安
000028E0  C0 91 53 93 87 00 00 71-64 64 88 C0 91 53 93 9E   全島..qdd安全到
000028F0  92 42 00 00 71 66 88 C0-91 53 94 B4 00 00 71 67   達..qf安全問..qg
00002900  88 C0 91 53 8A B4 00 00-71 78 73 88 C0 91 53 8C   安全感..qxs安全係
00002910  57 9D C9 00 00 72 31 32-88 C0 91 52 00 00 72 34   數..r12安然..r4
00002920  32 88 A4 90 6C 00 00 88-A4 99 5A 00 00 98 FC 91   2愛人..愛兒..做然
00002930  52 00 00 EA 7E 91 52 00-00 72 6C 88 A4 8E A2 97   ..黯然..rl愛爾蘭
00002940  96 00 00 72 6C 69 88 A4-8E A2 97 96 E5 E1 00 00   ..rli愛爾蘭語..
00002950  72 73 73 EA 7E 91 52 8E-B8 90 46 00 00 72 75 69   rss黯然失色..rui
00002960  88 C0 91 52 96 B3 9C 99-00 00 73 31 34 88 C0 90   安然無恙..s14安
00002970  87 00 00 88 C0 93 4B 00-00 73 34 31 88 C3 8F 9D   睡..安適..s41暗傷
00002980  00 00 88 C3 8E 45 00 00-73 34 32 88 C2 8E 9E 00   ..暗殺..s42按時
00002990  00 73 34 34 88 C3 8E 5A-00 00 88 C3 8E A6 00 00   .s44暗算..暗示..
000029A0  88 C3 8E BA 00 00 8A DD-8F E3 00 00 E2 47 8E 96   暗室..岸上..噯呀
000029B0  00 00 73 6C 88 A4 8F E3-97 B9 00 00 88 C0 8F E3   ..sl愛上了..安上
000029C0  97 B9 00 00 74 31 31 89-9A 93 CA 00 00 74 31 34   了..t11凹凸..t14
000029D0  88 A3 92 51 00 00 88 A3-92 56 00 00 88 A3 92 C9   哀嘆..哀歎..哀痛
000029E0  00 00 74 32 32 E9 E0 93-AA 00 00 EA 87 93 AA 00   ..t22縈頭..懇頭.
000029F0  00 74 34 34 88 C3 92 54-00 00 74 62 70 89 9A 93   .t44暗探..tbp凹
00002A00  CA 95 73 95 BD 00 00 74-6A 89 9A 93 A7 8B BE 00   不平..tj凹透鏡.
00002A10  00 75 31 32 88 C0 8A EB-00 00 75 31 33 88 C0 E8   .u12安危..u13安隱
00002A20  AA 00 00 75 31 34 88 C0-88 D4 00 00 75 34 32 88   ..u14安慰..u42愛
00002A30  A4 95 8F 00 00 75 6A 75-88 A4 89 47 8B 79 89 AE   撫..uju愛烏及屋
00002A40  00 00 75 74 72 88 C3 96-B3 93 56 93 FA 00 00 78   ..utr暗無天日..x
00002A50  31 31 88 C0 90 53 00 00-00 78 31 32 88 A3 90 C9 00   11安心..x12哀情
00002A60  00 88 C0 91 A7 00 00 88-C0 8F CB 00 00 88 C0 8A   .安息..安祥..安閑
```

TABLE 3

| CONSONANTS | | | | VOWELS | | CONFUSING VOWELS | |
|---|---|---|---|---|---|---|---|
| ㄅㄆㄇㄈㄉㄊㄋㄌㄍㄎㄏㄐㄑㄒ | B P M F D T N L G K H J Q X | ㄓㄔㄕㄖㄗㄘㄙ儿 | Z C S R Z C S R | ㄧㄨㄩ | I W U | ㄚㄛㄜㄠㄞㄡㄤㄥㄣㄢㄝㄟ | ∧ |

TABLE 4

```
00000400  8C 00 0E 00 62 64 74 94-BC 93 B1 E9 93 00 00 64   ....bdt半導體..d
00000410  62 93 64 95 F1 00 00 64-63 93 64 8E A5 00 00 64   b電報..dc電磁..d
00000420  64 93 B1 93 64 00 00 64-68 93 64 98 62 00 00 64   d導電..dh電話..d
00000430  6A 93 64 8F A0 00 00 64-6C 93 64 97 E9 00 00 93   j電匠..dl電鈴..電
00000440  64 E3 9C 00 00 64 6C 69-93 AE 97 CD 8C B9 00 00   糟..dli動力源..
00000450  64 73 93 64 90 EE 00 00-64 78 93 64 90 4D 00 00   ds電扇..dx電信..
00000460  6A 64 E8 CE 93 64 00 00-90 DA EA 79 00 00 6C 64   jd靜電..接點..ld
00000470  98 52 93 64 00 00 97 8B-92 42 00 00 6C 6A E7 B4   漏電..雷達..lj迴
00000480  8F 53 00 00 6C 7A 97 CA-8E 71 00 00 00 00 00 00   轉..lz量子......
```

TABLE 5

```
000007F0  00 00 00 00 00 00 00 00-00 00 00 00 00 00 00 00   ................
00000800  45 00 09 00 61 34 88 C4-00 00 62 31 95 EF 00 00   E...a4梁..b1包..
00000810  62 33 94 C5 00 00 96 7B-00 00 95 5C 00 00 62 34   b3版..本..表..b4
00000820  ED 4E 00 00 63 34 99 7C-00 00 63 33 8F EA 00 00   .N..c4返..c3場..
00000830  63 34 99 65 00 00 64 34-91 E0 00 00 00 00 00 00   c4册..d4隊......
```

TABLE 6

```
00001000   64 03 40 00 6D 74 66 88-A2 9C 5C 91 C9 98 C5 30   d.@.mtf阿彌陀佛0
00001010   00 6D 7A 88 A4 96 CA 8E-71 32 00 6E 31 32 88 C0   .mz愛面子2.n12安
00001020   94 4A 30 00 88 C0 94 5C-31 00 88 C0 93 EC 30 00   寧0.安能1.安南0.
00001030   6E 31 34 9B 53 9B 50 32-00 6E 34 33 9C E3 9C BB   n14婀娜2.n43懊惱
00001040   31 00 88 C2 E7 E4 31 00-6F 31 34 88 A5 89 EC 31   1.按鈕1.o14挨餓1
00001050   00 70 31 32 88 A2 94 6B-30 00 88 C0 94 72 31 00   .p12阿婆0.安排1.
00001060   88 C0 95 BD 30 00 70 33-34 E1 E2 E3 F4 31 00 70   安平0.p34矮胖1.p
00001070   67 88 C0 95 BD 8D 60 30-00 71 31 32 88 A3 8B 81   g安平港0.q12哀求
00001080   30 00 88 C0 91 53 31 00-71 34 31 88 A4 8B A8 30   0.安全1.q41愛卿0
00001090   00 88 A4 8D C8 30 00 71-34 32 88 A4 8F EE 30 00   .愛妻0.q42愛情0.
000010A0   88 C2 8A FA 32 00 88 C4-8F EE 30 00 71 34 34 88   按期2.案情0.q44暗
000010B0   C3 8A ED 30 00 98 FC 9F-86 30 00 71 62 6C 88 C0   器0.做氣0.qbl安
000010C0   91 53 E0 DE 97 9E 30 00-71 63 73 88 C0 91 53 91   全玻璃0.qcs安全措
000010D0   5B 8E 7B 30 00 71 64 88-C0 91 53 9B E6 30 00 88   施0.qd安全帶0.安
000010E0   C0 91 53 93 87 30 00 71-64 64 88 C0 91 53 93 9E   全島0.qdd安全到
000010F0   92 42 30 00 71 66 88 C0-91 53 94 B4 30 00 71 67   達0.qf安全閥0.qg
00001100   88 C0 91 53 8A B4 30 00-71 78 73 88 C0 91 53 8C   安全感0.qxs安全係
00001110   57 9D C9 30 00 72 31 32-88 C0 91 52 33 00 72 34   數0.r12安然3.r4
00001120   32 88 A4 90 6C 30 00 88-A4 99 5A 30 00 98 FC 91   2愛人0.愛兒0.做然
00001130   52 32 00 EA 7E 91 52 32-00 72 6C 88 A4 8E A2 97   2.嗷然2.rl愛閒
00001140   96 30 00 72 6C 69 88 A4-8E A2 97 96 E5 E1 30 00   0.rli愛閒甜0.
00001150   72 73 73 EA 7E 91 52 8E-B8 90 46 30 00 72 75 69   rss嗷然失色0.rui
00001160   88 C0 91 52 96 B3 9C 99-30 00 73 31 34 88 C0 90   安然無恙0.s14安睡
00001170   87 30 00 88 C0 93 4B 32-00 73 34 31 88 C3 8F 9D   0.安適2.s41暗偽
00001180   31 00 88 C3 8E 45 31 00-73 34 32 88 C2 8E 9E 33   1.暗殺1.s42按時3
00001190   00 73 34 34 88 C3 8E 5A-31 00 88 C3 8E A6 31 00   .s44暗尊1.暗示1.
000011A0   88 C3 8E BA 30 00 8A DD-8F E3 30 00 E2 47 8E 96   暗室0.岸上0.礙事
000011B0   31 00 73 6C 88 A4 8F E3-97 B9 31 00 88 C0 8F E3   1.sl愛上了1.安上
000011C0   97 B9 31 00 74 31 31 89-9A 93 CA 32 00 74 31 34   了1.t11凹凸2.t14
000011D0   88 A3 92 51 31 00 88 A3-92 56 31 00 88 A3 92 C9   哀嘆1.哀歎1.哀痛
000011E0   31 00 74 32 32 E9 E0 93-AA 30 00 EA 87 93 AA 30   1.t22鰲頭0.鼇頭0
000011F0   00 74 34 34 88 C3 92 54-31 00 74 62 70 89 9A 93   .t44暗探1.tbp凹
00001200   CA 95 73 95 BD 30 00 74-6A 89 9A 93 A7 8B BE 30   凸不平0.tj凹透鏡0
00001210   00 75 31 32 88 C0 8A EB-30 00 75 31 33 88 C0 E8   .u12安危0.u13安隱
00001220   AA 32 00 75 31 34 88 C0-88 D4 31 00 75 34 32 88   2.u14安慰1.u42愛
00001230   A4 95 8F 31 00 75 6A 75-88 A4 89 47 8B 79 89 AE   撫1.uju愛烏及屋
00001240   30 00 75 74 72 88 C3 96-B3 93 56 93 FA 32 00 78   0.utr暗無天日2.x
00001250   31 31 88 C0 90 53 30 00-78 31 32 88 A3 90 C9 31   11安心0.x12哀惜1
00001260   00 88 C0 91 A7 31 00 88-C0 8F CB 30 00 88 C0 8A   .安息1.安祥0.安閑
```

TABLE 7

| ROOT | PRONUN-CI-ATION | CUSTOMARY USE | | IDEA ASSOCIATION USE | | ROOT | PRONUN-CI-ATION | CUSTOMARY USE | | IDEA ASSOCIATION USE | |
|---|---|---|---|---|---|---|---|---|---|---|---|
| 1 STROKE | | | | | | 女子宀寸小 | 女子 | N∨ | | | |
| 一丨丶丿乙亅 | 乙 | 横 | H′ | | | 尢尸屮山巛 | 寸小 | C丶 X∨ | 寶蓋 | B∨ | | |
| | 一∨Y丶 | 直 | Z′ | | | 工巳巾干幺 | | π | | | 尢 | 大 A- |
| | | 點 | D∨ | | | 广廴廾弋 | 山川 | S- | | | 屍 | S- |
| | | 撇 | P∨ | | | 弓彐彡彳 | 工巳巾 | C- G∨ J∨ | | | 屯 | T′ |
| | | 勾 | G- | | | | 干 | J- G- | | | | |
| 2 STROKES | | | | | | | 弓 | G- | | | | |
| 二亠人亻 | 二 | R丶 | | | | | | | | | (頁) | 幺 A- |
| 儿入八冂 | 人 | R′ | | 頭 | T2 | 亢 | K- | | | 建 | J丶 | |
| 冖冫几凵 | 入 | R丶 | | 人 | R′ | 兒 | R′ | 儿 | R′ | 弁 | B丶 | |
| 刀力勹匕 | 八 | B- | | | | 冉 | R∨ | | | 式 | R丶 | |
| 匚匸十卜 | 几 | J- | | 兩點水 | L′ | 冥 | M′ | 冂 | M- | 互 | H丶 | |
| 卩厂厶又 | 刀 | D- | | | | 冰 | B- | ⼌ | M- | | | |
| | 力 | L丶 | | 包 | B- | 凹 | A- | 冫 | B- | | | |
| | 七 | B∨ | | | | | | 几 | J- | | | |
| | 十 | S′ | | | | | | 凵 | U- | | | |
| | 卜 | B∨ | | | | 匡 | K- | 勹 | B- | | | |
| | | | | | | 匡 | K- | 匸 | F- | | | |
| | | | | | | | | | | 彡(三) | S- | |
| | | | | | | | | | | 雙人 | S- | 彳 C- |
| | | | | | | 卽 | J′ | 卩 | Z- | | | |
| | | | | | | 厄 | A丶 | 厂 | H- | | | |
| | | | | | | 去 | Q丶 | 厶 | S- | | | |
| | 又 | Y丶 | | | | 又 | Y丶 | | | | | |
| 3 STROKES | | | | | | 4 STROKES | | | | | |
| 口囗 | 口 | K∨ | | | | 心忄 | 心 | X- | | | | |
| 土 | 土 | T∨ | | | | 戈戶 | 戈戶 | G- H丶 | | | | |
| 士 | 士 | S丶 | | | | 手扌 | 手 | Z- | 提手 | T′ | | |
| 夂夕大 | | | | | | 支文 | 支文 | Z- U′ | | | | |
| | 夕 | X丶 | | 夏 | X丶 | 攵 | P- | 斗斤方 | 斗斤方 | D∨ J- F- | | | |
| | 大 | D丶 | | | | 旡日曰 | | | 無 | U′ | | |
| | | | | | | 月木欠 | 日曰 | R丶 U- | | | | |
| | | | | | | | 月木 | U丶 M丶 | | | | |
| | | | | | | | 欠 | Q丶 | | | | |

TABLE 8

| ROOT | PRONUN-CI-ATION | CUSTOMARY USE | IDEA ASSOCIATION USE | ROOT | PRONUNCIATION | COSTOMARY USE | IDEA ASSOCIATION USE |
|---|---|---|---|---|---|---|---|
| 止歹 | 止歹 | Z、D、 | | 禾穴立 | 禾穴立 | H、X、L、 | |
| 殳母比毛氏气灬火爪父爻爿片牙牛犭犬 | 殳毋比毛氏 | M、B、M、S、 | 殷 I、 | | | | |
| | 火爪父 | H、Z、F | 氣 Q、 | | | | |
| | | | 爾 R、 | | | | |
| | 片牙牛犬 | P、I、N、Q、 | 爿 C、 | | | | |
| 5 STROKES | | | | 6 STROKES | | | |
| 玄玉瓜瓦甘生用田疋广疒白皮皿目矛矢石示禸 | 玄 | X、 | | 竹米系缶网羊羽老而耒耳聿肉月臣自至臼舌舛舟良色艸艹虍虫血行衣衤西 | 竹米 | Z、m、 | 絲字傍 S- | (紅)(c-) |
| | 玉 | U、 | | | 网羊羽老而耒耳聿 | W、I、U、L、R、L、R、U、 | | |
| | 瓜 | G-X、 | | | 肉月臣自至臼 | R、C、Z、Z、J、S、 | | 耕 G- |
| | 瓦甘生用 | G-S、I、T、 | | | 舌舛舟良色 | C、Z-L-S、 | | |
| | 田疋 | P、 | 疏 S- | | 艹 | C、 | 草字頭 C、 | 舜 S、 |
| | 广疒發 | B、F- | 病 B、 | | 虍蟲 | | 虎頭 H、C、 蟲邊 C、 | |
| | 白皮皿目 | B、P、M、M、 | | | 虫血行 | X V X、(H、) | | |
| | 矛矢石 | M、S、S、 | | | 衣西 | I- X- | | |
| | 示禸 | | 禸 U、 | 7 STROKES | | | |
| | | | | 見角言谷 | 見角言谷 | J、J、I、G、 | |

TABLE 9

| ROOT | PRONUN-CIATION | | CUSTOMARY USE | | IDEA ASSOCIATION USE | | ROOT | PRONUN-CI-ATION | | CUSTOMARY USE | | IDEA ASSOCIATION USE | |
|---|---|---|---|---|---|---|---|---|---|---|---|---|---|
| 豆 | 豆 | D、 | | | | | 10 STROKES | | | | | | |
| 豕 | 豕 | S3 | | | 豬 | Z- | 馬 | 馬 | M∨ | | | | |
| 豸 | | | | | 豹 | B、 | 骨 | 骨 | G∨ | | | | |
| 貝 | 貝 | B、 | | | | | 高 | 高 | G- | | | | |
| 赤 | 赤 | C、 | | | | | 髟 | | | 髮 | F∨ | | |
| 走 | 走 | Z∨ | | | | | 鬥 | 鬥 | D、 | 髟 | | | |
| 足 | 足 | Z、 | | | | | 鬯 | | | 鬯 | | | |
| 身 | 身 | S- | | | | | 邑 | 邑 | C、 | | U、 | | |
| 車 | 車 | C- | | | | | 鬲 | 鬲 | L、 | | | | |
| 辛 | 辛 | X- | | | | | 鬼 | 鬼 | G∨ | | | | |
| 辰 | 辰 | C、 | | | | | 11 STROKES | | | | | | |
| 辵 | | | 走左右 | | Z∨ | | 魚 | 魚 | U、 | | | | |
| 邑 | | | 馬阝 | | R∨ | | 鳥 | 鳥 | N∨ | | | | |
| 阜 | | | | | | | 鹵 | 鹵 | L∨ | | | | |
| 酉 | 酉 | I∨ | | | | | 鹿 | 鹿 | L、 | | | | |
| 釆 | 釆 | C3 | | | | | 麥 | 麥 | M∨ | | | | |
| 里 | 里 | L∨ | | | | | 麻 | 麻 | M、 | | | | |
| 8 STROKES | | | | | | | 12 STROKES | | | | | | |
| 金 | 金 | J- | | | | | 黃 | 黃 | H、 | | | | |
| 長 | 長 | (C、)Z∨ | | | | | 黍 | 黍 | S∨ | | | | |
| 門 | 門 | m、 | | | | | 黑 | 黑 | H- | | | | |
| 隶 | 隶 | D、 | | | | | 黹 | 黹 | Z∨ | 黻 | F、 | | |
| 隹 | 隹 | Z- | | | | | 13 STRKES | | | | | | |
| 雨 | 雨 | U∨ | | | | | 黽 | | | 鼈 | B、 | | |
| 青 | 青 | Q- | | | | | 鼎 | 鼎 | | | | | |
| 非 | 非 | F- | | | | | 鼓 | 鼓 | | | | | |
| 9 STROKES | | | | | | | 鼠 | 鼠 | | | | | |
| 面 | 面 | M、 | | | | | 14 STROKES | | | | | | |
| 革 | 革 | G、 | | | | | 鼻 | 鼻 | B、 | | | | |
| 韋 | 韋 | W、 | | | | | 齊 | 齊 | Q、 | | | | |
| 韭 | 韭 | J∨ | | | | | 15 STROKES | | | | | | |
| 音 | 音 | Y- | | | | | 齒 | 齒 | C∨ | | | | |
| 頁 | 頁 | Y、 | | | | | 16 STROKES | | | | | | |
| 風 | 風 | F- | | | | | 龍 | 龍 | L、 | | | | |
| 飛 | 飛 | F- | | | | | 龜 | 龜 | G- | | | | |
| 食 | 食 | S∨ | | | | | | | | | | | |
| 首 | 首 | S∨ | | | | | | | | | | | |
| 香 | 香 | X- | | | | | | | | | | | |

TABLE 10

| ROOT | PRONUN-CLATION | CUSTOMARY USE | IDEA ASSOCIATION USE | ROOT | PRONUN-CLATION | CUSTOMARY USE | IDEA ASSOCIATION USE |
|---|---|---|---|---|---|---|---|
| 17 STROKES | | | | | | | |
| 龠 | 鑰 ㄩˋ | | | | | | |

TABLE 11

```
00000C40  61 31 6E 33 EE FB 00 00-61 31 72 33 88 A2 00 00   a1n3....a1r3阿..
00000C50  61 31 74 32 88 A5 00 00-61 31 74 33 9A BA 00 00   a1t2挨..a1t3埃..
00000C60  61 31 7A 31 ED 41 00 00-61 32 62 31 EA 87 00 00   a1z1.A..a2b1癌..
00000C70  61 32 62 34 8A E0 00 00-61 32 6B 33 9A 72 00 00   a2b4癌..a2k3啊..
00000C80  61 32 72 34 8D 56 00 00-61 32 75 32 9D C2 00 00   a2r4昂..a2u2敖..
00000C90  61 32 7A 33 E7 A9 00 00-61 33 62 32 E1 AB 00 00   a2z3遨...a3b2嗌..
00000CA0  61 33 63 32 E5 A6 00 00-61 33 68 33 E0 92 00 00   a3c2锇..a3h3熬..
00000CB0  61 33 6D 32 E1 E2 00 00-61 33 6D 34 9E 93 00 00   a3m2矮..a3m4椏..
00000CC0  61 33 6E 33 9B 5B 00 00-61 33 71 34 9F 56 00 00   a3n3媪..a3q4敖..
00000CD0  61 33 72 32 89 B4 00 00-61 33 79 33 E8 C9 00 00   a3r2伡..a3y3誁..
00000CE0  61 34 62 33 88 C4 00 00-61 34 63 33 E4 88 00 00   a4b3案..a4c3艾..
00000CF0  61 34 64 34 89 9C 00 00-9A FA 00 00 61 34 68 31   a4d4奥..奥..a4h1
00000D00  EA 7E 00 00 61 34 69 31-89 A6 00 00 61 34 69 32   嚭..a4i1襖..a4i2
00000D10  E6 7D 00 00 61 34 6D 32-88 C5 00 00 61 34 6D 33   語..a4m2闇..a4m3
00000D20  EE 96 00 00 61 34 6D 34-88 C4 00 00 E1 D7 00 00   ....a4m4案..嗷..
00000D30  61 34 72 32 98 FC 00 00-61 34 72 33 E8 A5 00 00   a4r2傲..a4r3隌..
00000D40  61 34 72 34 88 C3 00 00-9E 42 00 00 61 34 73 31   a4r4暗..暗..a4s1
00000D50  8A DD 00 00 61 34 73 32-8A 56 00 00 E2 44 00 00   岸..a4s2砪..嗆..
00000D60  E2 47 00 00 61 34 73 33-E0 53 00 00 61 34 74 32   傲..a4s3澳..a4t2
00000D70  88 C2 00 00 9D 58 00 00-61 34 74 33 9A D2 00 00   按..拗..a4t3垇..
00000D80  61 34 78 31 88 A4 00 00-9C E3 00 00 61 34 79 32   a4x1熨..愖..a4y2
00000D90  E9 E0 00 00 61 34 79 33-E8 CD 00 00 61 34 79 34   縈..a4y3漾..a4y4
00000DA0  EE 66 00 00 62 31 61 31-9B 98 00 00 62 31 62 31   .f..b1a1扒..b1b1
00000DB0  99 75 00 00 94 AA 00 00-95 BA 00 00 95 EF 00 00   冰..八..兵..包..
00000DC0  EA 88 00 00 62 31 62 33-95 6F 00 00 62 31 62 34   篦..b1b3箅..b1b4
00000DD0  E1 8D 00 00 E6 CA 00 00-EE 6D 00 00 62 31 63 33   瓶..舥...m..b1c3
00000DE0  94 6D 00 00 E4 9A 00 00-E4 C8 00 00 E4 F7 00 00   芭..苞..浟..菊..
00000DF0  62 31 64 31 94 8D 00 00-62 31 64 33 9F 71 00 00   b1d1剎..b1d3殑..
00000E00  62 31 64 34 96 7A 00 00-62 31 66 31 E9 49 00 00   b1d4奔..b1f1誼..
00000E10  62 31 66 33 E9 95 00 00-62 31 67 32 95 DA 00 00   b1f3彪..b1g2輫..
00000E20  62 31 68 32 94 E9 00 00-62 31 68 33 95 56 00 00   b1h2秘..b1h3彪..
00000E30  62 31 69 31 E5 EF 00 00-62 31 69 34 94 D0 00 00   b1i1憂..b1i4頇..
00000E40  62 31 6A 31 94 A6 00 00-94 AB 00 00 9B F1 00 00   b1j1幡..鉢..帢..
00000E50  ED 80 00 00 EE E9 00 00-62 31 6B 33 99 DA 00 00   ........b1k3叭..
00000E60  62 31 6D 32 94 75 00 00-62 31 6D 34 94 74 00 00   b1m2盃..b1m4杯..
00000E70  95 57 00 00 9F 46 00 00-EA 71 00 00 62 31 6E 33   標..楒..魃..b1n3
00000E80  9B 6C 00 00 62 31 72 32-ED 54 00 00 62 31 72 33   娬..b1r2.T..b1r3
00000E90  96 4D 00 00 62 31 72 32-96 45 00 00 62 31 73 31   邦..b1r4胸..b1s1
```

TABLE 12

| | 1 | 2 | 3 | 4 | 5 | 6 | 7 |
|---|---|---|---|---|---|---|---|
| X | W | W | W | W | U | U | U |
| ␣ | U | U | U | U | I | I | I |
| CONFUSING VOWEL | A | E | O | I | A | E | O |
| MODE SELECTION SYMBOLS | E O V I | A O V I | E A V I | E A V O | A O V W | A O V W | E A V W |

TABLE 13

```
00001800  D1 00 21 20 20 22 20 20-23 20 20 24 20 20 28 20   ム.! " # $ (
00001810  20 61 34 61 61 6D 74 62-31 61 62 31 64 62 66 7A    a4aamtb1ab1dbfz
00001820  62 34 69 62 6B 62 62 6D-6A 62 34 72 62 31 74 62   b4ibkbbmjb4rb1tb
00001830  78 62 62 34 7A 63 32 61-63 31 64 63 34 67 63 31   xbb4zc2ac1dc4gc1
00001840  6A 63 33 6C 63 32 71 63-33 73 63 32 78 63 33 7A   jc3lc2qc3sc2xc3z
00001850  64 32 61 64 31 64 64 32-68 64 32 6A 64 34 6C 64   d2nd1dd2hd2jd4ld
00001860  34 70 64 33 73 64 31 78-64 33 7A 64 34 7A 66 31   4pd3sd1xd3zd4zf1
00001870  61 66 64 6A 66 33 69 66-34 6C 66 32 72 66 32 74   afdjf3if4lf2rf2t
00001880  66 31 7A 67 31 61 67 64-63 67 33 68 67 34 6A 67   f1zg1agdcg3hg4jg
00001890  6D 6A 67 32 73 67 34 78-68 31 61 68 32 64 68 34   mjg2sg4xh1ah2dh4
000018A0  68 68 6A 74 68 32 72 68-34 74 68 31 7A 69 32 61   hhjth2rh4th1zi2a
000018B0  69 63 67 69 32 67 69 34-69 69 6A 7A 69 31 6D 69   icgi2gi4iijzi1mi
000018C0  31 71 69 33 73 69 32 75-69 31 79 6A 31 61 6A 34   1qi3si2ui1yj1aj4
000018D0  63 6A 32 66 6A 31 69 6A-32 6A 6A 6A 73 6A 6C 6B   cj2fj1ij2jjjsjlk
000018E0  6A 31 71 6A 31 73 6A 73-63 6A 31 75 6A 78 6C 6A   j1qj1sjscj1ujxlj
000018F0  34 7A 6B 33 61 6B 31 69-6B 31 71 6B 78 6A 6C 32   4zk3ak1ik1qkxjl2
00001900  61 6C 32 64 6C 67 6C 6C-32 6A 6C 33 6C 6C 32 71   al2dlgll2jl3ll2q
00001910  6C 34 73 6C 32 78 6C 33-7A 6D 32 61 6D 33 66 6D   l4sl2xl3zm2am3fm
00001920  32 6A 6D 34 6D 6D 34 73-6D 32 79 6E 32 61 6E 68   2jm4mm4sm2yn2anh
00001930  6C 6E 32 6E 6E 34 78 6F-34 62 70 31 61 70 34 68   ln2nn4xo4bp1ap4h
00001940  70 31 70 70 32 78 71 31-61 71 34 66 71 32 6A 71   p1pp2xq1aq4fq2jq
00001950  31 6E 71 32 73 71 34 78-72 32 61 72 32 6A 72 32   1nq2sq4xr2ar2jr2
00001960  73 73 31 61 73 34 63 73-32 66 73 34 68 73 31 6A   ss1as4cs2fs4hs1j
00001970  73 31 6C 73 32 6D 73 34-71 73 33 73 73 74 68 73   s1ls2ms4qs3ssths
00001980  33 78 73 32 7A 74 31 61-74 31 66 74 32 69 74 32   3xs2zt1at1ft2it2
00001990  6C 74 32 72 74 74 64 74-31 7A 75 32 61 75 32 67   lt2rttdt1zu2au2g
000019A0  75 32 6B 75 71 6C 75 31-75 75 34 7A 76 62 64 77   u2kuqlu1uu4zvbdw
000019B0  31 61 77 32 62 77 34 62-77 32 63 77 34 63 77 32   1aw2bw4bw2cw4cw2
000019C0  64 77 34 64 77 32 66 77-31 67 77 33 67 77 32 68   dw4dw2fw1gw3gw2h
000019D0  77 34 68 77 32 69 77 34-69 77 31 6A 77 32 6A 77   w4hw2iw4iw1jw2jw
000019E0  34 6A 77 32 6B 77 32 6C-77 33 6C 77 34 6C 77 33   4jw2kw2lw3lw4lw3
000019F0  6D 77 32 6E 77 32 6F 77-33 70 77 31 71 77 34 71   mw2nw2ow3pw1qw4q
00001A00  77 34 72 77 32 73 77 34-73 77 32 74 77 34 74 77   w4rw2sw4sw2tw4tw
00001A10  33 75 77 31 78 77 33 78-77 32 79 77 31 7A 2A 34   3uw1xw3xw2yw1z*4
00001A20  7A 77 33 7A 77 34 7A 00-34 7A 78 31 61 78 32 64   zw3zw4z.4zx1ax2d
00001A30  78 32 68 78 31 6A 78 32-6C 78 32 70 78 31 73 78   x2hx1jx2lx2px1sx
00001A40  74 62 78 31 79 79 34 61-79 34 6A 79 6E 6B 79 32   tbx1yy4ay4jynky2
00001A50  78 7A 31 61 7A 63 73 7A-66 6A 7A 68 7A 7A 31 6A   xz1azcszfjzhzz1j
00001A60  7A 31 6C 7A 32 6E 7A 33-72 7A 34 73 7A 75 73 7A   z1lz2nz3rz4szusz
00001A70  31 7A 7A 7A 6C 00 00 00-00 00 00 00 00 00 00 00   1zzzl...........
```

TABLE 14

```
00001400  64 03 40 00 6D 74 66 88-A2 9C 5C 91 C9 98 C5 00   d.@.mtf阿彌陀佛.
00001410  00 6D 7A 88 A4 96 CA 8E-71 00 00 31 6E 32 88 C0   .mz愛而子..1n2安
00001420  94 4A 00 00 88 C0 94 5C-00 00 88 C0 93 EC 00 00   寧..安能..安南..
00001430  31 6E 34 9B 53 9B 50 00-00 34 6E 33 9C E3 9C BB   1n4婀娜..4n3懊惱
00001440  00 00 88 C2 E7 E4 00 00-31 6F 34 88 A5 89 EC 00   ..按鈕.1o4挨餓.
00001450  00 31 70 32 88 A2 94 6B-00 00 88 C0 94 72 00 00   .1p2阿婆..安排..
00001460  88 C0 95 BD 00 00 33 70-34 E1 E2 E3 F4 00 00 70   安平..3p4矮胖..p
00001470  67 88 C0 95 BD 8D 60 00-00 31 71 32 88 A3 8B 81   g安平港..1q2哀求
00001480  00 00 88 C0 91 53 00 00-34 71 31 88 A4 8B A8 00   ..安全..4q1愛卿.
00001490  00 88 A4 8D C8 00 00 34-71 32 88 A4 8F EE 00 00   .愛矯..4q2愛情..
000014A0  88 C2 8A FA 00 00 88 C4-8F EE 00 00 34 71 34 88   按期..案情..4q4暗
000014B0  C3 8A ED 00 00 98 FC 9F-86 00 00 71 62 6C 88 C0   器..傲氣..qbl安
000014C0  91 53 E0 DE 97 9E 00 00-71 63 73 88 C0 91 53 91   全玻璃..qcs安全措
000014D0  5B 8E 7B 00 00 71 64 88-C0 91 53 9B E6 00 00 88   施..qd安全帶..安
000014E0  C0 91 53 93 87 00 00 71-64 64 88 C0 91 53 93 9E   全島..qdd安全到
000014F0  92 42 00 00 71 66 88 C0-91 53 94 B4 00 00 71 67   達..qf安全閥..qg
00001500  88 C0 91 53 8A B4 00 00-71 78 73 88 C0 91 53 8C   安全感..qxs安全係
00001510  57 9D C9 00 00 31 72 32-88 C0 91 52 00 00 34 72   數..1r2安然..4r
00001520  32 88 A4 90 6C 00 00 88-A4 99 5A 00 00 98 FC 91   2愛人..愛兒..傲然
00001530  52 00 00 EA 7E 91 52 00-00 72 6C 88 A4 8E A2 97   ..靄然..rl愛爾蘭
00001540  96 00 00 72 6C 69 88 A4-8E A2 97 96 E5 E1 00 00   ..rli愛爾蘭裔..
00001550  72 73 73 EA 7E 91 52 8E-B8 90 46 00 00 72 75 69   rss靄然失色..rui
```

```
00001560  88 C0 91 52 96 B3 9C 99-00 00 31 73 34 88 C0 90    安然無恙..1s4安睡
00001570  87 00 00 88 C0 93 4B 00-00 34 73 31 88 C3 8F 9D    ..安適..4s1暗伺
00001580  00 00 88 C3 8E 45 00 00-34 73 32 88 C2 8E 9E 00    ..暗殺..4s2按時.
00001590  00 34 73 34 88 C3 8E 5A-00 00 88 C3 8E A6 00 00    .4s4暗算..暗示..
000015A0  88 C3 8E BA 00 00 8A DD-8F E3 00 00 E2 47 8E 96    暗室..岸上..礙那
000015B0  00 00 73 6C 88 A4 8F E3-97 B9 00 00 88 C0 8F E3    ..sl愛上了..安上
000015C0  97 B9 00 00 31 74 31 89-9A 93 CA 00 00 31 74 34    了..1t1凹凸..1t4
000015D0  88 A3 92 51 00 00 88 A3-92 56 00 00 88 A3 92 C9    哀嘆..哀歎..哀痛
000015E0  00 00 32 74 32 E9 E0 93-AA 00 00 EA 87 93 AA 00    ..2t2禁頭..耙頭.
000015F0  00 34 74 34 88 C3 92 54-00 00 74 62 70 89 9A 93    .4t4暗探..tbp凹凸
00001600  CA 95 73 95 BD 00 00 74-6A 89 9A 93 A7 8B BE 00    不平..tj凹透鏡.
00001610  00 31 75 32 88 C0 8A EB-00 00 31 75 33 88 C0 E8    .1u2安危..1u3安隱
00001620  AA 00 00 31 75 34 88 C0-88 D4 00 00 34 75 32 88    ..1u4安慰..4u2愛
00001630  A4 95 8F 00 00 75 6A 75-88 A4 89 47 8B 79 89 AE    撫..uju愛烏及屋
00001640  00 00 75 74 72 88 C3 96-B3 93 56 93 FA 00 00 31    ..utr暗無天日..1
00001650  78 31 88 C0 90 53 00 00-31 78 32 88 A3 90 C9 00    x1安心..1x2哀惜.
00001660  00 88 C0 91 A7 00 00 88-C0 8F CB 00 00 88 C0 8A    .安息..安祥..安閑
```

I claim:

1. A method for coding input of Chinese characters based upon the characters' phonetic sounds comprising the steps of:

(1) making a dictionary including:

an instruction code index section including a plurality of memory addresses, a plurality of machine codes respectively contained in memory locations of said memory addresses of said instruction code index section, and a plurality of instruction codes corresponding to said machine codes, and an input/output conversion section including a plurality of memory addresses, a plurality of machine codes respectively contained in memory locations of said memory addresses of said conversion section, and a plurality of input/output conversion instruction codes and Chinese characters;

(2) establishing a conversion table which converts each Chinese phonetic representation symbols to a predetermined English letter in accordance with phonetic similarities therebetween;

(3) establishing coding rules for coding Chinese characters as follows:

(i) when a Chinese phrase to be output has three or more characters, its input/output conversion instruction code includes a set of English letters phonetically resembling the first phonetic representation symbols of each Chinese character, wherein said English letters are arranged in the same order as said corresponding Chinese characters, (ii) when a Chinese phrase to be output has two characters, its input/output conversion instruction code includes two English letters phonetically resembling the respective first phonetic representation symbols of these Chinese characters, and two numerals designating respective tones of these Chinese characters, wherein said English letters and said numerals are arranged in a predetermined order, (iii) when a single Chinese character is to be output, its input/output conversion instruction code includes an English letter phonetically resembling the first phonetic representation symbol of this Chinese character, and a numeral designating tone of this Chinese character, wherein said English letter and said numeral are arranged in a predetermined order, (4) setting a mode selection symbol as a first symbol of instruction codes for English letter mode, said mode selection symbol being an English letter which is not present in said conversion table mentioned in step (2); and (5) making an ASCII code keyboard which has a plurality of English alphabet keys, some of said English alphabet keys being respectively marked with a corresponding Chinese phonetic symbol according to said conversion table mentioned in step (2), whereby, when any key on said keyboard is pressed, an ASCII code signal is generated and output.

2. A method as claimed in claim 1, wherein said step (5) includes the substep of selecting one Chinese phraseter from a Chinese phrase by in turn depressing a character choice key and selected one of several order number keys of said keyboard.

3. A method as claimed in claim 1, wherein said step (5) includes the substep of key-inputting said numeral or from a group of Chinese phrases by depressing selected one of numeral keys of said keyboard.

4. A method as claimed in claim 1, wherein said step (5) includes the substep of key-inputting said numeral or numerals in said instruction codes of said coding rule (iii) or (ii) by in turn depressing a tone choice key and one of several order number keys of said keyboard.

* * * * *